United States Patent [19]

Suga et al.

[11] Patent Number: 4,468,679

[45] Date of Patent: Aug. 28, 1984

[54] ON-DEMAND TYPE INK-JET PRINTER

[75] Inventors: Michihisa Suga; Mitsuo Tsuzuki, both of Tokyo, Japan

[73] Assignee: Nippon Electric Co., Ltd., Tokyo, Japan

[21] Appl. No.: 376,997

[22] Filed: May 11, 1982

[30] Foreign Application Priority Data

May 11, 1981 [JP] Japan .................................. 56-70465

[51] Int. Cl.$^3$ .............................................. G01D 15/18

[52] U.S. Cl. .................................... 346/140 R; 346/75

[58] Field of Search ............................ 346/75, 140 PD

[56] References Cited

U.S. PATENT DOCUMENTS 3,373,436 3/1968 Auphan ................................ 346/75

3,848,258 11/1974 Mahoney et al. ............ 346/140 PD 4,326,205 4/1982 Fischbeck et al. ........... 346/140 PD

*Primary Examiner*—George H. Miller, Jr.

*Attorney, Agent, or Firm*—Sughrue, Mion, Zinn, Macpeak, and Seas

[57] ABSTRACT

An ink-jet printer for recording information by jetting ink droplets on a recording medium has a plurality of ink-jet nozzles arranged so that ink droplets projected therefrom combine in flight at a space between the nozzles and the recording medium. The amplitude and the pulse width of driving signals used to deflect piezoelectric elements which contract to expel the ink droplets from the nozzles are appropriately varied to vary the momentum of the individual ink droplets projected from each nozzle so that the combined ink droplets will have a velocity and direction representative of the information to be recorded.

11 Claims, 8 Drawing Figures

ON-DEMAND TYPE INK-JET PRINTER

BACKGROUND OF THE INVENTION

1. Field of the Invention

The present invention relates to an on-demand type ink-jet printer for effecting a direct recording by jetting ink droplets on a recording medium, particularly to an on-demand type ink-jet printer having an improved deflection system for deflecting ink droplets jetting from an on-demand type ink-jet print head.

2. Description of the Prior Art

In a conventional ink-jet printer, an electrostatic deflection method is used for deflecting a flying ink droplet. A system utilizing such a method deflects the droplet along a deflecting electric field created by a pair of deflecting electrodes which are placed along, and to the side, of charged ink droplets. Such a system is disadvantageous in that it is required to enlarge a distance between an ink jet nozzle and a recording medium so that the deflecting electrodes can be inserted therebetween.

On the other hand, a so-called on-demand type ink-jet recording printer is also well known and has been used for a printer, facsimile equipment and the like. The ink-jet printer of the on-demand type is described in detail, for example, in the U.S. Pat. No. 3,946,398 entitled "METHOD AND APPARATUS FOR RECORDING WITH WRITING FLUIDS AND DROP PROJECTION MEANS THEREFOR" issued to E. L. Kyser et al.

In the on-demand type ink-jet printer, the velocities of the flying ink droplets are relatively slow and, when an interval between the formation of ink droplets is varied, properties such as the flying velocities and the volumes of the ink drops are largely varied also. Therefore, to record an undistorted picture, it is necessary to reduce the distance between the nozzle and the recording medium as small as possible. Consequently, it is difficult to record the picture with an excellent picture quality by using the electrostatic deflection electrodes on the on-demand type ink-jet system. Moreover, in case where a multi-nozzle head is constructed by integrating plural nozzles, it is extremely difficult in respect to the structure of the apparatus and the electrical insulation to arrange plural deflecting electrodes corresponding to the plural nozzles in a minute space.

In addition, when a repetition frequency of the ink droplets is varied in response to the picture signal, the flying velocities thereof is also varied. If the electrostatic deflection is carried out in this situation, it is extremely difficult to precisely control the deflection only by the deflection electric field, because the deflection angle is inversely proportional to the flying velocity of the ink droplet, so that the former is varied in response to the variation of the latter.

It is, therefore, an object of the present invention to provide an on-demand type ink-jet printer having a simplified deflection system.

SUMMARY OF THE INVENTION

According to the present invention, there is provided an on-demand type ink-jet printer comprising a print head including a plurality of droplet-forming means for jetting ink droplets, and driving means for driving the plurality of the droplet-forming means. Each of the droplet-forming means has a pressure chamber, pressure exertion means, and a nozzle. The nozzles in the plurality of the droplet-forming means are so arranged that the ink droplets jetted from the plurality of nozzles are combined with each other to produce combined droplets at a space between the nozzles and a recording medium. The combined droplets are applied on the recording medium. The ink droplets to be jetted from the nozzles are controlled by the driving signals applied to the pressure exertion means so that the combined droplets are deflected in response to information signals representative of an information to be recorded.

BRIEF DESCRIPTION OF THE DRAWINGS

Other features and advantages of the present invention will be apparent from the following description of preferred embodiments of the present invention taken in conjunction with the accompanying drawings, wherein.

DESCRIPTION OF THE PREFERRED EMBODIMENTS

Figure 1:
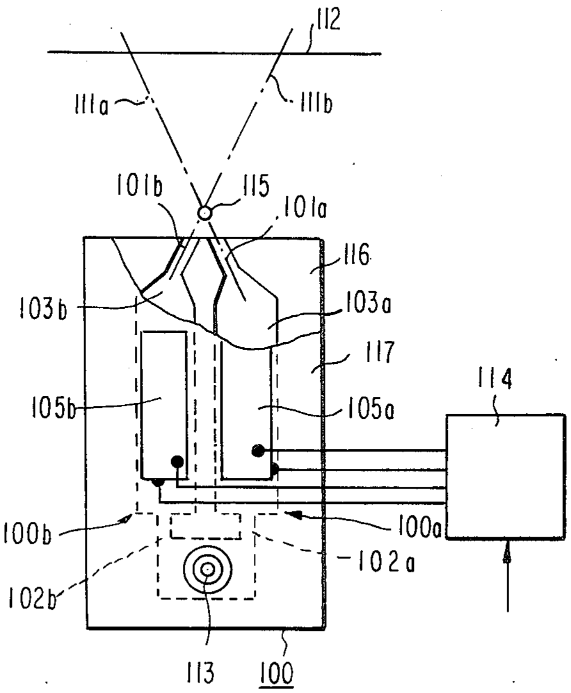
FIG. 1 is a schematic diagram of a first embodiment of the present invention.

Referring to FIG. 1, a first embodiment of the present invention comprises a print head 100 for jetting ink droplets on a recording medium or recording paper 112, and a driver circuit 114 for driving the print head 100.

The print head 100 includes two droplet-forming means **100*a* and 100*b*, which are composed of nozzles 101 (101*a* and 101*b*), ink supply passages 102 (102*a* and 102*b*), ink pressure chambers 103 (103*a* and 103*b*), and piezoelectric elements 105 (105*a* and 105*b*). The piezoelectric elements 105 are secured on outside walls of the ink chambers 103. The nozzles 101 are arranged and slanted relative to each other so that flying loci 111 (111*a* and 111*b*) of ink droplets jetted therefrom intersect at a space or crosspoint 115 between the nozzles 101 and a recording medium 112**.

The ink is guided from a reservoir tank (not shown) through a pipe, and then supplied to the nozzles 101 by a hose connector 113 through the supply passages 102 and the ink chambers 103. When driving pulses are applied from the driver circuit 114 to the piezoelectric elements 105, the piezoelectric elements are deformed. As a result, the walls of the ink chambers 103 are also deformed inward so that the volumes thereof are reduced. Pressures in the ink chambers 103 are increased by these deformations, so that the ink droplets are jetted from the nozzles 101.

In the first embodiment, the nozzles 101, the ink chambers 103 and the ink supply passages 102 are constructed by being formed in a form of a slot on a planar member 116 and then by putting another planar member 117 thereupon. The piezo-electric elements 105 are secured on outside portions of the planar member 117 which portions form walls of the ink chambers. For these planar members 116 and 117, a metal plate such as a stainless steel plate and a nickel plate, various inorganic materials such as glass and ceramics or various organic materials such as various kinds of plastic plates can be used. There have been well known, as a method for forming the slot, a mechanical formation, a discharge formation, a supersonic formation, a photo-etching method, an electro-forming method, a casting method and the like. For the adhesion of two planar members, one of various appropriate adhesions is employed in response to the used material. In addition, other methods such as lead soldering, silver soldering and heat adhesion can be used, if required by the used material. For securing the piezoelectric elements, organic adhesives or lead soldering can be employed.

The volume and velocity of the ink droplet jetted from the nozzle by the application of the electric pulse on the piezoelectric element can be varied in proportion to the time duration and the amplitude of the applied electric pulse. The driver circuit 114 is employed for varying the volumes and the flying velocities of the ink droplets by varying the time durations and/or the amplitudes of the driving pulses.

The ink droplets are jetted respectively from the two nozzles 101*a* and 101*b* at a timing such that the ink droplets produced collide and are combined with each other at the crosspoint 115 of respective flying loci 111*a* and 111*b* of the ink droplets. That is, timings at which the driving pulses are applied on the piezo-electric elements 105*a* and 105*b* are shifted by a time difference between the time durations required for the two ink droplets jetted from the nozzles 101*a*, 101*b* to reach the crosspoint 115. As the amplitude of the driving pulse applied is increased, the fying velocity of the ink droplet produced thereby is also increased. Accordingly, to insure an appropriate collision at the crosspoint 115 the timing of the application of the electric pulse is delayed by a time duration dependent on the amplitude of the electric pulse. It is desirable to set the position of the crosspoint 115 as close as possible to the nozzles 101*a*, 101*b* so that the shift of the timing of the application of the driving pulse can be reduced. However, it is not required that the combination of the two ink droplets is effected such that respective centers of gravity thereof coincide with each other just on the crosspoint 115. For instance, it is sufficient that these two ink droplets come into contact with each other such that these two ink drops fly in a state united with each other. Consequently, in case where the distance between the crosspoint 115 and the nozzles is less than 300 μm, the respective timings of the applications of the driving pulses can be set substantially the same so that no time duration delay is required.

Figure 2:
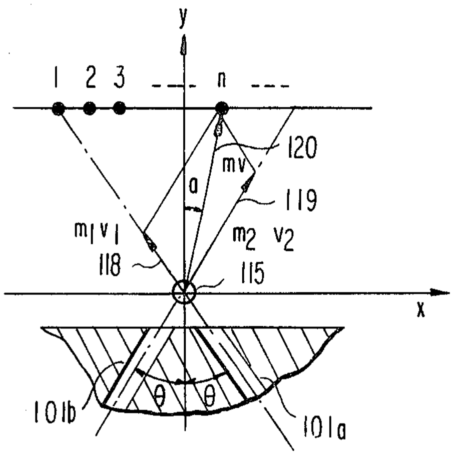
FIG. 2 is a diagram for explaining the principle of deflection control according to the present invention.

The variation of the flying velocity and the flying direction of the ink droplets combined at the crosspoint 115 are decided according to the law of conservation of momentum in the completely inelastic collision between these two ink droplets. That is, as shown in FIG. 2, assuming that the volumes and the flying directions of the ink droplets jetted from the nozzles 101*a* and 101*b* are denoted by $m_1$, $v_1$ and $m_2$, $v_2$ respectively, the momenta of these two ink droplets immediately before the combination thereof are $m_1 \cdot v_1$ and $m_2 \cdot v_2$, respectively, as indicated by arrows 118 and 119, where the directions indicate respective flying directions of these two ink drops and the lengths indicate the amounts of the momenta. According to the law of conservation of momentum, the flying direction and the amount of the momenta of the combined ink droplets can be expressed respectively by a direction and a length of an arrow 120 which corresponds to a diagonal of a rhombus two sides of which correspond to the arrow 118 and 119.

Assuming that x and y coordinates are employed which have a point of origin which corresponds to the crosspoint 115, and the coordinates x and y are set respectively parallel and perpendicular to an end plane of the nozzles 101*a*, 101*b* and that the angles between the nozzles 101*a* and 101*b* and the y coordinate are commonly set to $\theta$, the volume m, the flying velocity v and the deflection angle $\alpha$ of the combined ink droplets can be respectively represented as follows.

$$m = m_1 + m_2 \tag{1}$$

$$v = \frac{m_1 \cdot v_1 + m_2 \cdot v_2}{m_1 + m_2} \tag{2}$$

$$\alpha = \tan^{-1}\left(\frac{-m_1 \cdot v_1 + m_2 \cdot v_2}{m_1 \cdot v_1 + m_2 \cdot v_2}\tan\theta\right) \tag{3}$$

Although the effect of the air resistance is neglected in the above explanation, it cannot be neglected when the flying distance of the ink droplet is long, so that the relations as expressed by the equations (1) to (3) cannot be maintained. However, in case where the distance between the nozzles and the recording medium is set less than 10 mm, and desirably less than 5 mm, the effect of the air resistance can be substantially neglected, so that the deflection control can be effected on the basis of the relations as expressed by the equations (1) to (3).

In the deflection control based on the law of conservation of momentum as mentioned above, the amounts which can be set as the volumes and the flying velocities of the ink droplets jetted from the nozzles for obtaining a predetermined deflection angle are not restricted only to a single set thereof, so that several combinations thereof can be set. The selection of these combinations of the amounts should be decided by referring to what kind of recording is desired. For example, in a case where the recording of only characters or line drawings is desired, it is desirable to maintain the volume of the combined ink droplet always at a constant amount for all deflection angles. Moreover, from the view point of the structural facilitation of the apparatus, it is desirable also to maintain constant the time duration expired from the droplet jetting to the collision thereof upon the recording medium for all deflection angles.

These maintenances can be realized by appropriately selecting the amplitudes and the pulse widths of the driving pulses to be applied upon the piezoelectric elements. However, the relation between the amounts of the amplitudes and the pulse widths applied to the piezoelectric elements 105 and the desired values of the deflection angle, the volume and the flying velocity of the combined ink droplet is not restricted to a single set, and further is varied in response to the difference of the shape and the size of the ink-jet print head. In practice, the range of the combination of the deflection angle, the volume and the flying velocity of the combined ink droplet which is required for a predetermined recording operation is restricted, so that it is possible to select at every occasion ones which are suitable for the predetermined deflection operation out of the amplitudes and the pulse widths of the driving pulse which are required for various combinations of these amounts and have been experimentally obtained previously.

The driver circuit 114 for achieving the above mentioned selection to provide the driving pulses to be applied to the piezoelectric elements 105 will be described in detail with reference to FIG. 3.

Prior to the recording, picture elements arranged in a row on the recording medium 112 have been successively numbered by 1, 2, 3, . . . , n, . . . as shown in FIG. 2, and the condition of the driving pulses required for jetting ink droplets onto those picture elements has been experimentally obtained.

The obtained condition regarding the amplitude and the time duration of the driving pulses are standardized and then converted into binary codes, which are fixedly memorized respectively on memory rows 1, 2, 3, . . . , n, . . . in memories 121 (121*a* and 121*b*) and 122 (122*a* and 122*b*) such as ROM's. The contents of the memory rows 1, 2, 3, . . . , n, . . . in the memories 121 and 122 are successively read out into buffer memories 124 (124*a* and 124*b*) and 125 (125*a* and 125*b*) in response to a clock signal derived from an oscillator 123. The outputs of the buffer memories 124 are converted into voltage amplitudes by D-A converters 126 (126*a* and 126*b*). On the other hand, the outputs of the buffer memories 125 (125*a* and 125*b*) are converted into time durations by D-A converter 127 (127*a* and 127*b*). Outputs of these converters 126 and 127 are applied to analog gate circuits 128, (128*a* and 128*b*), so as to form voltage pulses having predetermined amplitudes and predetermined time durations. The voltage pulses are applied to modulators 129 (129*a* and 129*b*), so as to be on-off controlled in response to the picture signal supplied through a gate circuit 130, and lastly applied to the piezoelectric elements 105 (105*a* and 105*b*) through amplifiers 131 (131*a* and 131*b*).

Figure 3:
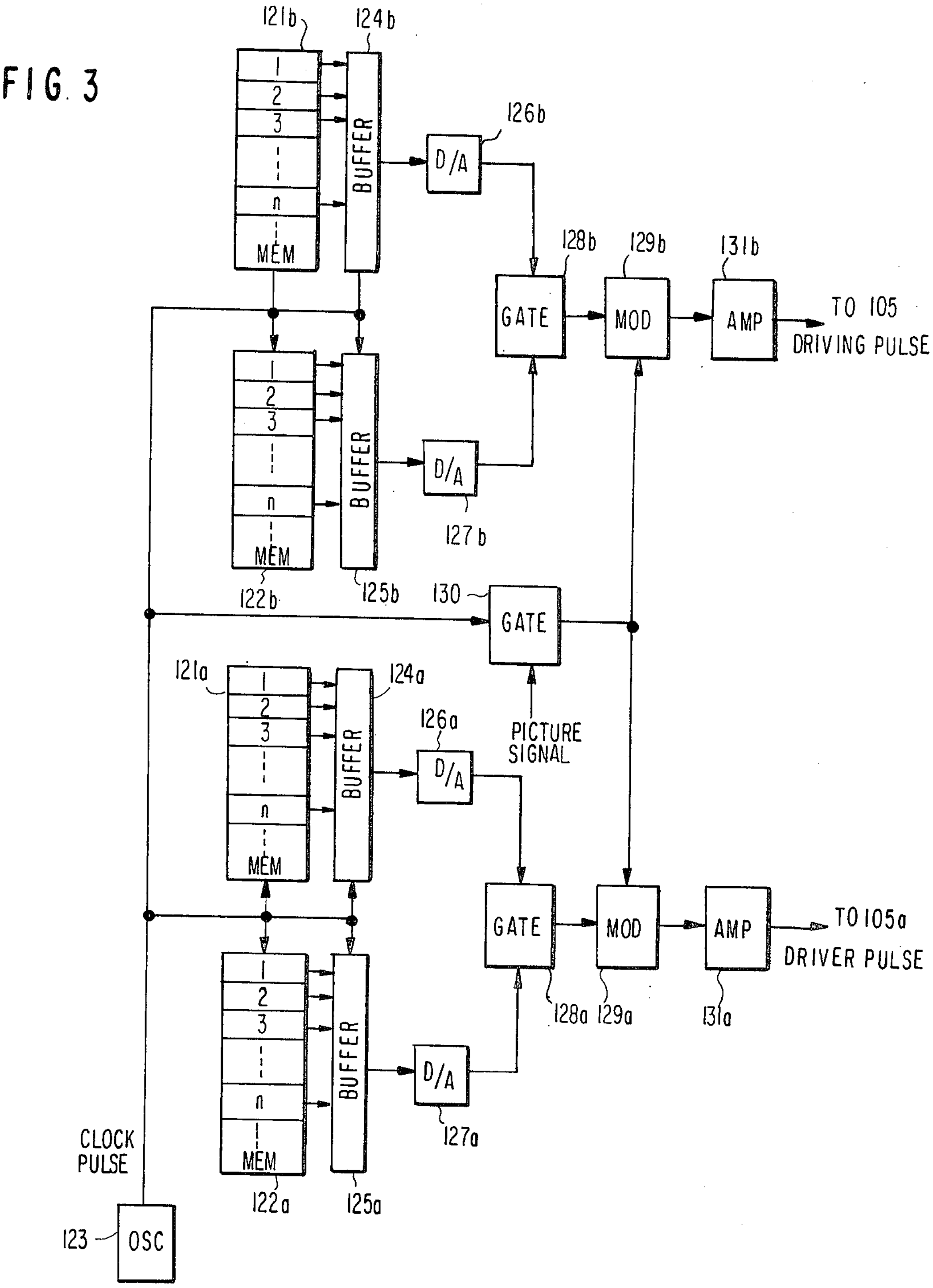
FIG. 3 is a block diagram showing an example of a driver circuit in the first embodiment of the present invention.

Although, in the driver circuit 114 shown in FIG. 3, the amplitudes and pulse widths of the driving pulses are varied in response to a deflection signal or the picture signal, it is also possible to deflect the combined droplets by controlling at least ones of the amplitudes and pulse widths.

Figure 4A:
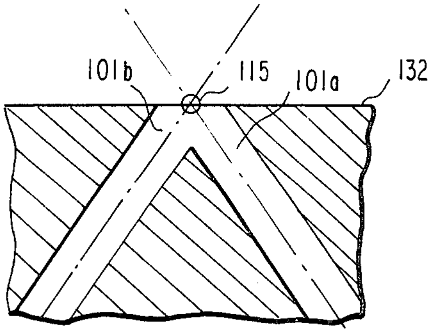
FIGS. 4(*a*) and 4(*b*) are cross-sectional views of other examples of nozzle constructions to be used in the first embodiment of the present invention.
Figure 4B:
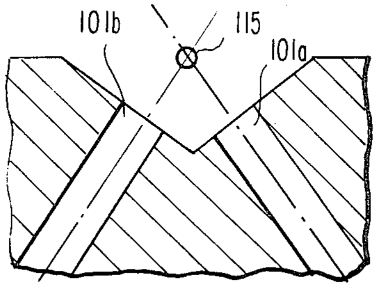

As mentioned above, according to the present invention, the nozzles are arranged such that ink droplets jetted from plural nozzles are directed to a single cross-point disposed at a space between the recording medium and the nozzles. However, the shape of the nozzles is not limited to the embodiment as shown in FIG. 1. For example, as shown in FIG. 4(*a*), it is possible to effect the deflection control under the arrangement of the nozzle such that the cross-point 115 is disposed just on the end plane 132 of the nozzles, and it is effective also with respect to the stability of the droplet formation that the end plane 132 of the nozzles be arranged perpendicular to one another, as shown in FIG. 5.

Figure 5:
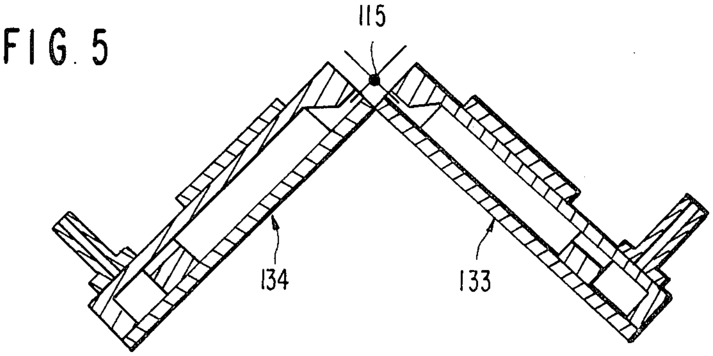
FIG. 5 is a cross-sectional view of a print head portion in a second embodiment of the present invention.

In addition, as shown in FIG. 5, the ink-jet print head can be constructed by unifying two droplet-forming means 133 and 134 so that flying load of ink droplets jetted therefrom respectively are intersected by each other at the single cross-point 115.

Figure 6:
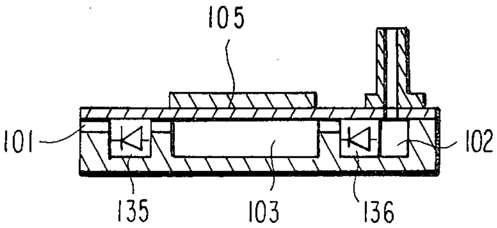
FIG. 6 is a cross-sectional view of a modification of the print head used in the first embodiment.

As described in our U.S. copending patent application Ser. No. 274,210, fild on June 16, 1981, entitled "PRINTER HEAD FOR AN INK-ON-DEMAND TYPE INK-JET PRINTER", and as shown in FIG. 6, the droplet-forming means can be provided with minute valves 135 and 136 for controlling fluid resistances under the effect of the ink pressure, on both sides of the nozzle 101 and the ink supply passsage 102 of the ink chamber 103, whereby it is possible to more easily perform the control of the momentum of the ink droplet. It is possible to stably form the ink droplet, even if the amplitude and the pulse width of the driving pulse to be applied to the piezoelectric element 105 are varied in a wider range than that in a conventional apparatus. Further it is possible also to realize ink drop forming means by providing the minute valve only on either one side.

Figure 7:
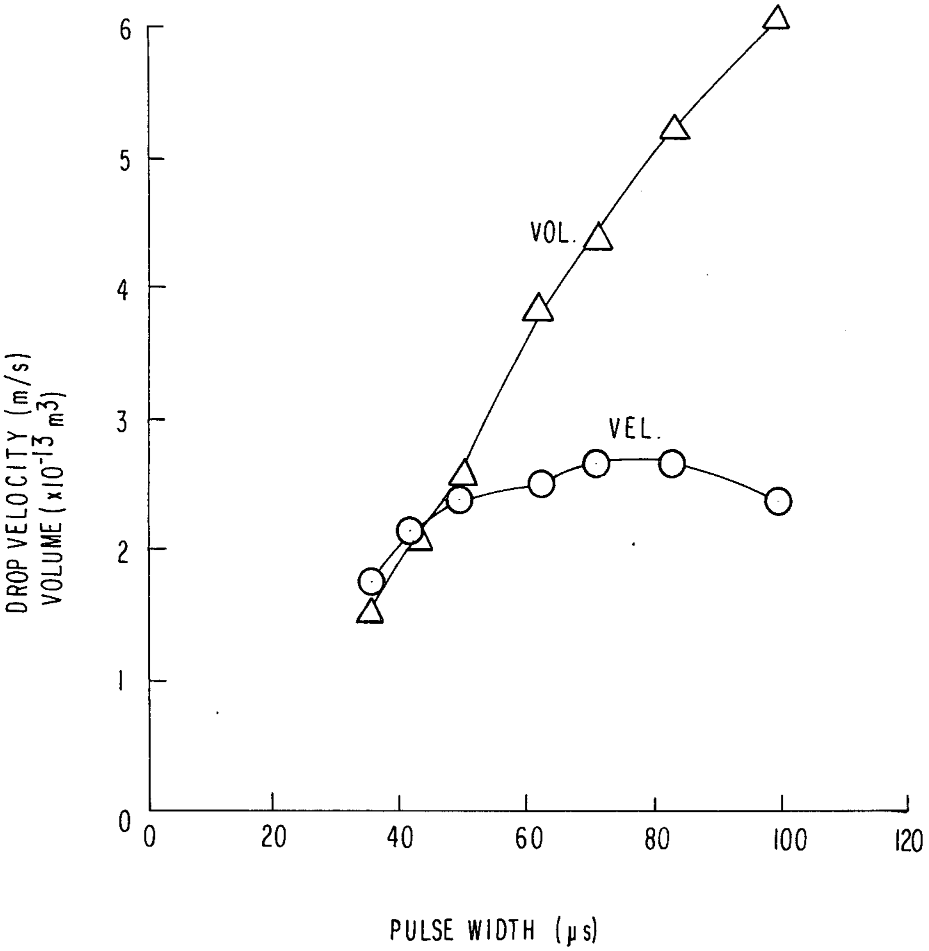
FIG. 7 shows characteristics of one example of the droplet-forming means.

Assuming that the print head has the minute valve as shown in FIG. 5, and the nozzle of 50 $\mu m\phi$, the piezoelectric element of 13 mm$\times$2 mm$\times$0.6 mm, and the ink chamber of 14 mm$\times$2.4 mm$\times$0.4 mm, the pulse width v.s. drop volume and pulse-with v.s. drop velocity characteristics have been obtained, as shown in FIG. 7. In case where the pulse width is varied from 40 $\mu$sec to 100 $\mu$sec, the ratio of momenta is obtained as follows:

$$\frac{P\,(40\ \mu\text{sec})}{P\,(100\ \mu\text{sec})} = \frac{1.5 \times 10^{-13} \times 1.8}{6 \times 10^{-13} \times 2.2} \approx \frac{1}{5}$$

When the above droplet-forming means are positioned perpendicular to each other as shown in FIG. 5, the deflection angle of about 70° can be obtained.

Furthermore, in the first embodiment as shown in FIG. 1, although the deflection of one-dimensional scanning is effected by employing two ink droplet-forming means, it is possible also to effect the deflection of two-dimensional scanning by employing three ink drop forming means.

What is claimed is:

1. An ink-jet printer for recording an information by jetting ink droplets on a recording medium, said printer comprising:

a print head including a plurality of droplet-forming means for jetting said ink droplets onto said recording medium, each of said droplet-forming means having a pressure chamber filled with ink, pressure-exertion means for exerting a pressure on said ink filled in said pressure chamber in response to a driving signal, and a nozzle for jetting said ink droplets, the nozzles in said plurality of said droplet forming means being arranged so that said ink droplets jetted from said nozzles are combined with each other to produce combined droplets at a space between said nozzles and said recording medium, said combined droplets being applied onto said recording medium; and print head driving means for producing a plurality of said driving signals in response to information signals representative of said information, said plurality of driving signals being applied to said plurality of pressure exertion means in said plurality of droplet-forming means, respectively, at least one of the velocities and volumes of said droplets jetted from said nozzles being varied in response to said driving signals so that said combined droplets are deflected in response to said information signals.

2. The printer as claimed in claim 1, wherein said print head driving means includes a plurality of driver circuits for producing said driving signals to be applied to said pressure exertion means.

3. The printer as claimed in claim 2, wherein each of said driver circuits includes means for controlling at least one of an amplitude and a pulse-width of said driving signal.

4. The printer as claimed in claim 2, wherein each of said driver circuits includes memory means for memorizing data representative of deflection data for said combined droplets.

5. The printer as claimed in claim 4, wherein said memory means are ROM's.

6. The printer as claimed in claim 1, wherein said print head driving means includes:

memory means for storing at least one of amplitude data and pulse-width data;

means for reading out said stored data;

means responsive to the read out data for producing said driving signal having the amplitude and pulse-width responding to said information signal.

7. The printer as claimed in claim 1, wherein said droplet-forming means further includes means for controlling fluid resistance in response to a pressure in said pressure chamber.

8. The printer as claimed in claim 1 wherein said space where said combined droplets are formed lies substantially in a plane containing outermost ends of said nozzles.

9. The printer as claimed in claim 1 wherein ends of planes of two of said nozzles are perpendicular to one another.

10. The printer as claimed in claim 1 wherein the droplet forming means are utilized to achieve two-dimensional scanning.

11. The printer as claimed in claim 1 further comprising at least one minute valve located on a side of said nozzle in at least one of said droplet forming means to control a momentum of said ink droplet formed by said nozzle in said at least one of said droplet forming means.

* * * * *